United States Patent [19]
Hawes et al.

[11] Patent Number: 5,322,035
[45] Date of Patent: Jun. 21, 1994

[54] HYDROLOGICAL SYSTEM FOR A CLOSED ECOLOGICAL SYSTEM

[75] Inventors: Philip B. Hawes; Margret Augustine, both of Oracle, Ariz.

[73] Assignee: Space Biospheres Ventures, Oracle, Ariz.

[21] Appl. No.: 734,618

[22] Filed: Jul. 23, 1991

[51] Int. Cl.⁵ .............................................. A01K 63/00
[52] U.S. Cl. .................................... 119/227; 119/211
[58] Field of Search ................ 119/3, 5, 226, 227, 119/211; 434/126, 151, 299; 244/159

[56] References Cited

U.S. PATENT DOCUMENTS

| | | | |
|---|---|---|---|
| 3,122,126 | 2/1964 | Yamada | 119/3 |
| 3,495,572 | 2/1970 | Groves | 119/3 |
| 3,661,262 | 5/1972 | Sanders | 119/5 |
| 3,741,158 | 6/1973 | Moe, Jr. et al. | 119/3 |
| 3,827,290 | 8/1974 | Carlson | 434/126 |
| 4,077,158 | 3/1978 | England | 119/3 |
| 4,137,868 | 2/1979 | Pryor | 119/3 |
| 4,169,050 | 9/1979 | Serfling et al. | 119/3 |
| 4,299,066 | 11/1981 | Thompson | 244/159 |
| 4,394,846 | 7/1983 | Roels | 119/3 |
| 4,754,571 | 7/1988 | Riechmann | 119/5 |
| 5,005,521 | 4/1991 | Strong | 119/5 |
| 5,040,486 | 8/1991 | Pack | 119/3 |
| 5,058,529 | 10/1991 | Chiu | 119/3 |

FOREIGN PATENT DOCUMENTS 3149829  6/1983  Fed. Rep. of Germany ...... 244/159

Primary Examiner—John J. Wilson
Assistant Examiner—T. Manahan
Attorney, Agent, or Firm—Christie, Parker & Hale

[57] ABSTRACT

A method for establishing a hydrological cycle in a closed ecological system is disclosed. The hydrological cycle results in the establishment of a variety of different micro-environments which simulate micro-environments of Earth. The hydrological cycle further results in the establishment of a symbiotic interrelation of organisms in that are established within the different micro-environments, where the wastes generated by organisms of one micro-environment are removed by organisms of a second environment and are used as nutrients. This biological purification of the water maintains the purity and functionality of the water for continual use within the closed ecological system.

17 Claims, 3 Drawing Sheets

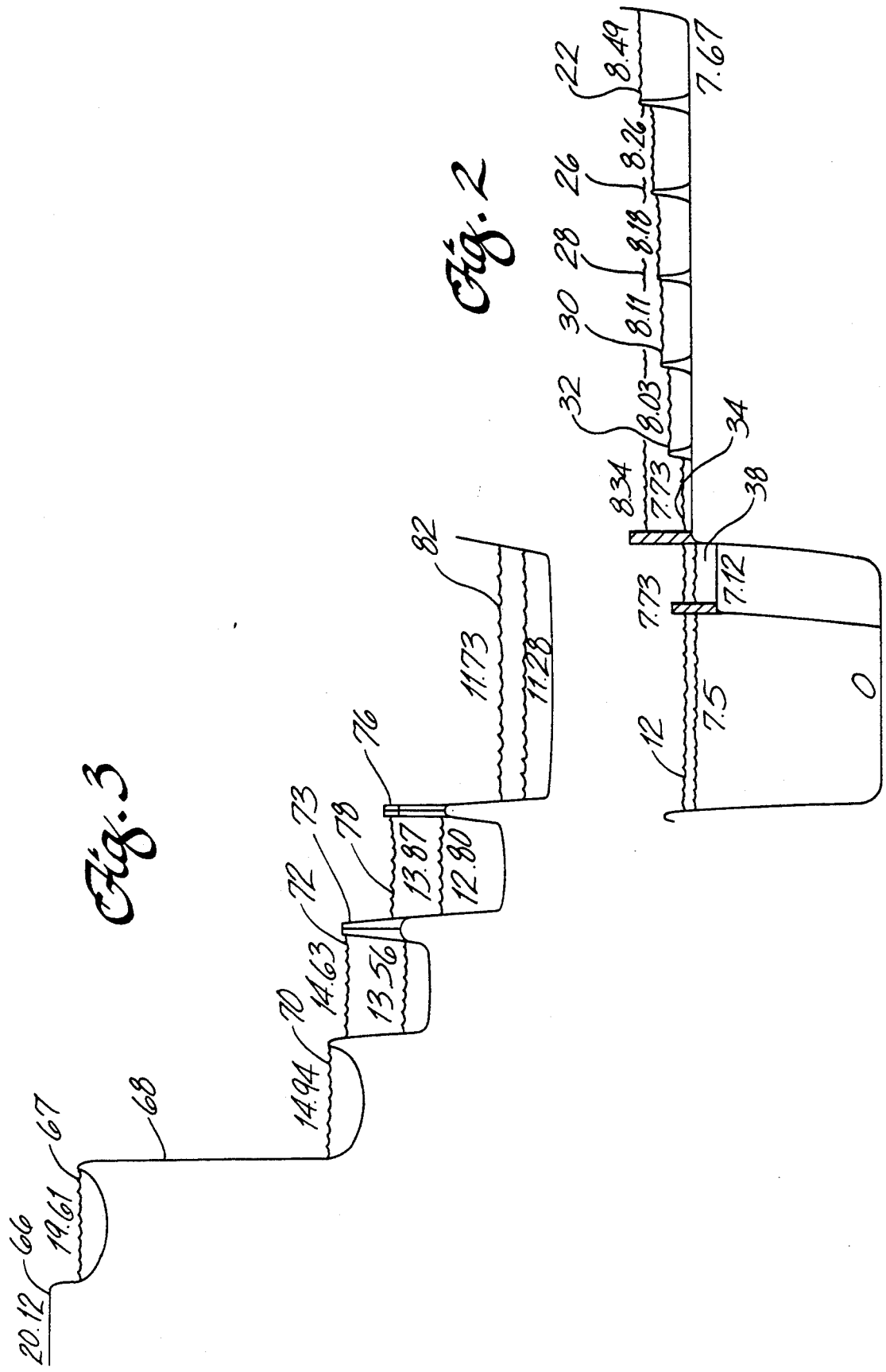

HYDROLOGICAL SYSTEM FOR A CLOSED ECOLOGICAL SYSTEM

FIELD OF THE INVENTION

This invention relates to a closed ecological system, including humans, which is completely isolated from the Earth's environment insofar as transfer of matter is concerned. In particular, the invention relates to a hydrological cycle within a closed homeostatic ecological system. The water in the hydrological cycle supports the growth of a wide diversity of organisms and is continuously recycled so that it remains usable.

BACKGROUND OF THE INVENTION

The Earth comprises a biosphere in which microorganisms, plants, and animals, including humans, exist in a more-or-less steady state. However, the amount of pollution introduced into the environment of the Earth is increasing, and the natural ability of the environment to dilute and detoxify this pollution is becoming overwhelmed. The pollution of the Earth's environment is leading to the extinction of many species of wildlife and may prove to threaten the survival of all life forms on Earth unless a means of detoxifying and recycling pollutants, created by man at an ever-increasing rate, is found and implemented.

Moreover, as man ventures beyond the bounds of Earth and into space or to the depths of the oceans, life support systems will necessarily have to be transported with him. The resources that go with man will be limited and not readily replaced. Therefore, it will be necessary to recycle these resources and to prevent an accumulation of pollutants generated within the closed environments.

It is desirable to provide a microcosm of Earth's environment, to study the interaction of components of the environment and a variety of forms of pollution that are generated on a daily basis, and to develop techniques for influencing our environment in a positive manner. Such studies are impossible, or difficult at best, in the open system provided on Earth, since matter is exchanged between the Earth's and the study's environments. This exchange results in a dilution of the pollutants that are generated by the study and, also, introduces extraneous pollutants from the surrounding atmosphere. To adequately test and evaluate the procedures for coping with the pollution generated by day-to-day life, it is desirable to provide a system that is completely enclosed. The enclosed environment prevents matter from being exchanged between the study and the Earth's environment. Since the environment is enclosed, and is of very limited volume, matter within the environment has to be recycled and detoxified, to prevent a rapid corruption of the air and water of the enclosed environment or the need to continually dedicate an ever-increasing portion of the enclosed environment to the storage of useless trash.

Currently, a completely contained ecological system, referred to as Biosphere 2, is being established near Oracle, Ariz. The system completely encloses about one hectare of land and about 175,000 cubic meters of space, isolated from the Earth's environment by an impermeable skin so that no matter is transferred.

Biosphere 2 is intended to be as complete a simulation of the Earth's environment as possible, and, therefore, the diversity of the micro-environments that exist on Earth are duplicated within Biosphere 2. As a result of this diversity of micro-environments, a suitable ecosystem for the growth of the numerous organisms selected from these micro-environments, including man, is also provided.

An essential component of the environment of Earth and, therefore, Biosphere 2 is water. Water acts as a means of transporting pollutants or nutrients away from a region where they are created, diluting them, and carrying them to other regions, where they can be detoxified or used as sustenance for other organisms. The aqueous components of Biosphere 2 consists of saltwater, freshwater, and potable water. Each of these water systems provides a suitable micro-environment for the establishment of a variety of organisms, including man. Nutrients/pollutants that accumulate in one micro-environment, by the actions of the organisms present in that micro-environment, can be transported to another micro-environment, where they are removed by the different organisms that are present.

As well as distribution of nutrients and dilution of pollutants, water circulation is necessary to aerate the water and prevent stagnation. This water circulation therefore provides the general conditions suitable to foster the growth of a wide variety of diverse organisms.

Water within Biosphere 2 is limited and, therefore, must be recycled. It is important that water be appropriately treated, decontaminated, or purified at each step within the complete water cycle. For example, saltwater must be desalted before it is introduced into a freshwater micro-environment, and waste water and sewage must be purified and decontaminated before the water can be reused, thus preventing the possible accumulation and spread of pathogenic organisms.

The treatment, decontamination, and purification of water in this closed environment, therefore, provide a model for water purification and recycling in the environment of Earth and for the establishment of extraterrestrial or undersea colonies or other closed systems.

The operation of Biosphere 2 demonstrates the feasibility and efficiency of such methodologies.

SUMMARY OF THE INVENTION

The present invention provides a method for establishing a hydrological cycle in a closed ecological environment having a limited water supply and isolated from the environment of Earth. The purity of the water in the hydrological cycle is maintained by relying on, and establishing a symbiotic relationship among, a variety of organisms established in micro-environments within the closed ecological environment. Wastes generated by the organisms of one micro-environment are removed by organisms of a second environment and used as nutrients. The method comprises the steps of: establishing colonies of a variety of organisms derived from different micro-environments of Earth, within the closed ecological environment; providing seasonal water supplies so that micro-environments are established which simulate the environments of Earth from which the organisms were selected; providing water recirculation between the different micro-environments; and providing means for purifying the water so that the quality of the recirculated water simulates the water quality of the micro-environments of Earth from which the organisms were selected.

BRIEF DESCRIPTION OF THE DRAWINGS

The features and advantages of the present invention will be better understood when considered with reference to the following detailed description and the accompanying drawings, where:

FIG. 2 is a schematic longitudinal cross-sectional view through a marshland/ocean biome;

FIG. 3 is a schematic longitudinal cross-sectional view through a Rainforest/Savannah biome.

DETAILED DESCRIPTION

Figure 1:
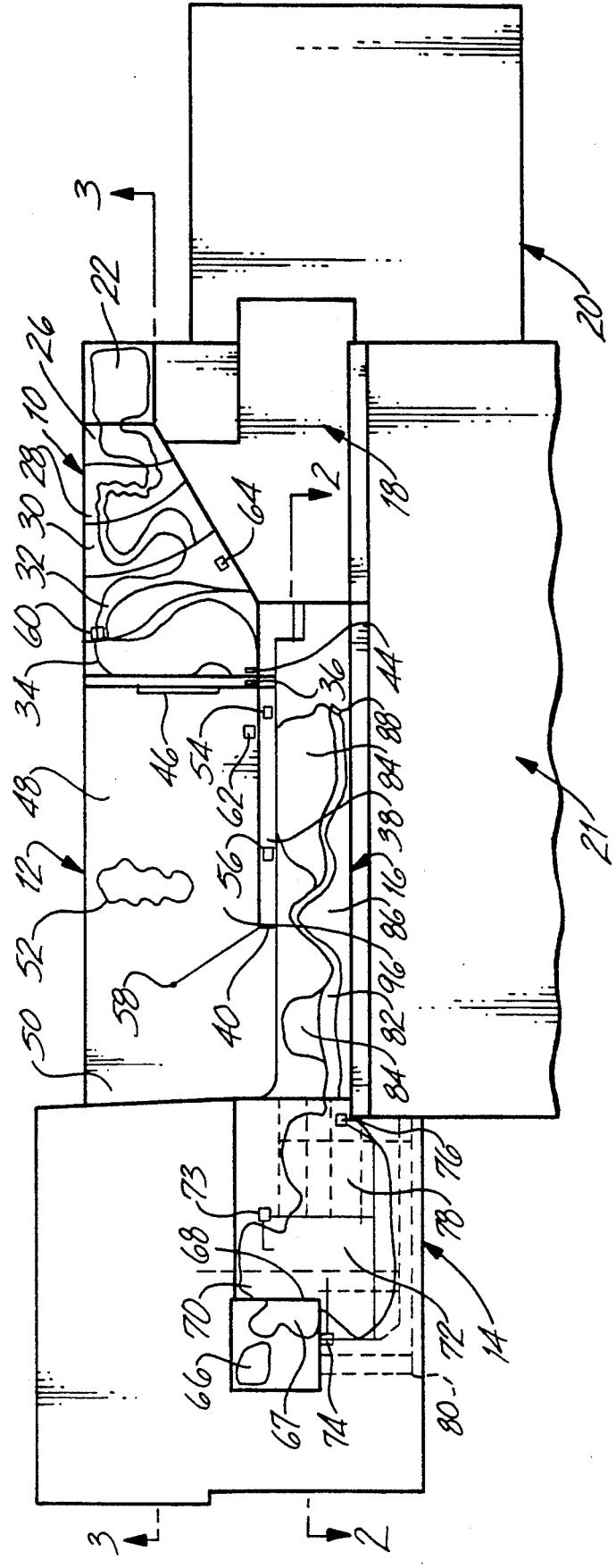
FIG. 1 is a schematic plan view of a closed ecological system.

FIG. 1 shows the general layout of the micro-environments (biomes) within Biosphere 2. Represented are an Estuary or Marshland region or biome 10, an Ocean region or biome 12, a Rainforest region or biome 14, a Savannah region or biome 16, a Thorny Scrub region or biome 18, a Desert region or biome 20, and an Agricultural Zone and Human Habitat 21.

A qualitative description is given in the following sections which outline the biomes in which water is used in Biosphere 2 and the various uses of the water. It also describes an overall recycling plan of the water. Under the heading "WATER CYCLE," a quantitative description of one embodiment of a water balance of Biosphere 2 is given.

THE MARSHLAND/OCEAN BIOMES

The Marshland

The water in the Estuary region is freshwater at its source 22 and increases in salinity as it flows downwards to its outlet 44 into the Ocean 12. (See FIG. 2 for the relative elevation of the biomes and high and low water levels.) The Ocean is saltwater, having a salts content similar to Earth's oceans.

Varying salinity in the Marshland is created by the action of a tide which simulates the tides that occur in nature. Such tides are important for the establishment of aquatic ecosystems suitable for the growth of a wide variety of organisms. To create the tides, saltwater is transferred from the Ocean to the Estuary 34. Freshwater is also continually added to the Estuary from the Freshwater Pond 22 at the source of the Estuary. The Pond is at the highest elevation in the Estuary, at 8.49 meters relative to an arbitrary datum for Biosphere 2. The freshwater flows downstream, i.e., to a lower elevation, from the Freshwater Pond, to an Oligohaline Marsh 26, then, in turn, to a Salt Marsh 28, to a Black Mangrove Marsh 30, to an Oyster Bay 32, and finally, to a Red Mangrove Marsh 34, which is at the lowest elevation in the Marshland, at 7.73 meters.

Saltwater is also continually added to the Marshland by pumping Ocean water into the Red Mangrove Marsh, via a pump 36. The saltwater mixes with the water in the Red Mangrove Marsh, and, as the water level rises, a salt gradient is created. The Red Mangrove Marsh has the highest salt concentration in the Marshland, and the Oligohaline Marsh has the lowest salt concentration.

Each of the regions of the Marshland is separated by a wall, each of which has a weir depression that is preset to retain the low-tide water level, i.e., the depression in the wall is at a height that will determine the low-tide level within each of the regions of the Marshland. The depressions also allow water inflow into each of the regions when the preset height or level of its weir depression is exceeded by the incoming tide. For example, the low-tide level is 7.73 meters in the Red Mangrove Marsh, 8.03 meters in the Oyster Bay, 8.11 meters in the Black Mangrove Marsh, 8.18 meters in the Salt Marsh, and 8.26 meters in the Oligohaline Marsh.

At high tide (spring tide) in the Marshland, the level of the water is 8.34 meters. At this high-tide level, water will rise through all the Marshland, including the Oligohaline Marsh. It is only periodically at "spring tide," when the water level is at its highest, that saltwater will be introduced to the elevation of the Oligohaline Marsh.

When the Marshland is experiencing a spring tide of 8.34 meters, the Ocean is at its low-tide (neap tide) level of 7.5 meters. At low tide in the Marshland, the water level is 7.73 meters at the same time the Ocean is at its high-tide level of 7.73 meters.

High tide in the Marshland is created by inhibiting the flow of water out of the Marshland and by continually adding water to the Marshland. During high tide, organic matter, nitrogen compounds, and other materials are accumulated in the water from the organisms that grow in the Marshland. When high tide in the Marshland has been reached, water is released from the Marshland and flows into a "Crabwalk" 38 tidal capacitor. The high nutrient level of the water from the Marshland is diluted in the Crabwalk by mixing with Ocean water and by passing the water over algal scrubbers before it is finally allowed to enter the Ocean.

When low tide in the Marshland is reached, the flow from the Marshland is inhibited, and the water level is once again allowed to rise by pumping from the Ocean.

The Crabwalk

The Crabwalk is a partitioned area which runs most of the length of the Ocean and which is open to the Ocean at its end 40.

The dilution of the water released from the Marshland is important, since it is high in compounds such as those containing nitrogen. While Marshland water is a valuable source of nutrients for much of the wildlife in the Ocean, very high concentrations of nitrogen compounds can prove toxic to some of them. Therefore, it is important to lower concentrations of nitrogen and other nutrients in Marshland water to acceptable levels. Dilution of the nutrients in the water from the Marshland is achieved by mixing water from the Marshland with the Ocean water present in the Crabwalk. In addition, water from the Crabwalk is processed through "scrubbers," which remove nutrients, toxic compounds, and particulate matter from the water. Intakes 54 and outlets 56 for these scrubbers are located in the Crabwalk.

The Tides

The flow from the Marshland, and therefore the tidal cycle, is regulated by a water-level control device 44 located in the Red Mangrove Marsh, adjacent to the Ocean. The water-level control device incorporates a tiltable pipe, which, in one embodiment, has an open upper end through which water from the Marshland can flow. The tiltable pipe is, in turn, connected to a drain pipe which directs the flow of water from the Marshland into the Crabwalk.

The tiltable pipe has a wide diameter which allows small animals, such as some species of crab, to have access to both the Marshland and the Ocean. Animals such as crabs require the different ecosystems that are established in saltwater oceans and marshlands for feeding and also for breeding. Therefore, it is important that these animals, if they are to flourish, are able to gain access to both of these environments. The wide diameter of the tiltable pipe allows animals such as crabs to crawl through the pipe. In addition to allowing animals to crawl through the pipe, the wide diameter of the pipe also results in a gentle flow of water, rather than a "waterfall," through the pipe. A waterfall created in the pipe could result in harm to animals that were crawling through when the tides were changing and water was being reintroduced into the Ocean.

Tides are created and regulated by the actions of a programmable stepping motor, which can be programmed so that its action, in raising and lowering the tiltable pipe, simulates natural tidal cycles over a 28-day period, i.e., a lunar month. In natural environments, there are two high and low tides within a lunar day (24 hours, 51 minutes). It is therefore desirable to provide two high and low tides within Biosphere 2. In the Estuary, the maximum water-level displacement between high and low tides is about 60 centimeters. However, as in natural environs, the tidal variation each day is not at maximum displacement. Instead, the tidal displacement varies throughout the month, with maximum high displacement (spring tide) and maximum low displacement (neap tide) only being reached about once a month. The tides at other times of the month are at lower displacements.

The tides within Biosphere 2 are set to simulate natural tidal displacement throughout the 28-day lunar month. In addition to the requirement of two tides per lunar day, it is desirable that the tides also resemble the tidal amplitude changes or displacements of natural tides, which vary throughout the lunar month. For example, at the beginning of the month, the tidal amplitude can be close to its maximum of 30 centimeters above the mean tide at high tide and 30 centimeters below the mean tide at low tide. However, as the lunar month progresses, the amplitude may be as little as zero displacement from the mean tide for the high or the low tide. At the end of the 28-day lunar month, the amplitude would again be at its maximum, completing the monthly cycle. The stepping motor is programmed to simulate these desired tidal changes.

The changes in the amplitudes of the tides and the times of high and low tides are desirable to foster the growth of tidal organisms, since the "biological clocks" of these organisms are timed to coincide with these natural rhythms. Duplicating this environment allows the organisms to flourish by coordinating the rhythms of the organisms and promoting natural symbiotic relationships between the organisms.

During the tidal cycle, water is being cycled from the Ocean to the Marshland and back again. In addition, freshwater is continually being added from the Freshwater Pond to the Marshland and, hence, to the Ocean. To prevent the Ocean from "overflowing," and also to prevent the Ocean water from being diluted with respect to its salt concentration, water is removed from the Ocean and desalted. This water can then be used as a freshwater supply, where needed, throughout Biosphere 2. The resulting brine is returned to the Ocean.

As discussed above, the Crabwalk is a partitioned area which acts as an "intermediate" separator tank and is used to treat nutrient- and nitrogen-rich tidal-return flows from the Estuary before they enter the Ocean. In addition to nitrogen, the Estuary water contains impurities and particulate matter, all of which are preferably removed or reduced prior to returning the water to the Ocean.

Dilution of the water returning from the Estuary is achieved by mixing water from the Estuary with the Ocean water present in the Crabwalk. In addition to dilution, water from the Crabwalk is processed through "scrubbers," referred to as "algal turf scrubbers," which remove nutrients, nitrogen, pollutants, and particulate matter from the water.

Intakes 54 and outlets 56 for the algal turf scrubbers are located in the Crabwalk. Additional intakes 58 and 60 for additional sets of scrubbers are also located in the Ocean and the Estuary, respectively. Outlets 62 and 64 for the scrubbers are located in the Ocean and the Estuary, respectively. The algal turf scrubbers are located under the Thorny Scrub region in a "basement."

The Algal Turf Scrubbers

The algal turf scrubbers comprise beds of algae which act as biological converters, converting nutrients or pollutants in the Ocean, Estuary, or Crabwalk water into complex organic matter that can be used as compost, fodder for animals, or as a food supplement for humans. The algae extract nutrients and nitrogenous wastes from the water.

The algal bed is a flat, mesh screen that provides an anchor and support for the growth of algae. Other essential growth requirements for the algae are aeration and agitation of the water to distribute nutrients, to remove any waste products generated and to minimize shadowing of the algae by other algae in the algal bed.

In natural growth environments, these requirements are met by the actions of waves. In the algal turf scrubber, these requirements are met by the manmade generation of a wave across the face of the algal bed. This smooth wave action across the entire face of the algal bed promotes even growth of the algae across the entire algal bed and inhibits the occurrence of overgrown clumps of algae in isolated areas.

Dissipation of the wave is required to prevent a reflected wave from traveling back across the algal bed, disrupting a new wave traveling down the algal bed. In addition, the wave is dissipated to prevent excessive agitation of the water at the downstream end of the algal turf scrubber and stirring up of particulate matter. To prevent a reflected wave, a wave interceptor is provided at the downstream end of the algal bed. Water from each algal turf scrubber is returned to the Crabwalk, Marshland, or Ocean, as appropriate.

A settling tank in the algal turf scrubber provides a large volume of "still" water, so that particulate matter suspended in the water may sediment, under gravity, and can be removed from the water before it is recirculated back to the Crabwalk, Marshland, or Ocean.

Artificial lights over the algal turf scrubbers are provided. Since algae are photosynthetic, light is an essential requirement for their growth.

Algae carry out photosynthesis, a reaction in which carbon dioxide and water are converted to sugar and oxygen, in the presence of light. This reaction confers on the algae the ability to generate oxygen and to reduce the ambient levels of carbon dioxide.

In addition to their photosynthetic ability, many algae are also capable of fixing nitrogen or of utilizing nitrogen in the form of free nitrogen, nitrogen oxide, hydrazoic acid, hydrogen cyanide, and other nitrites. Therefore, much of the nitrogen can be removed from the water by the establishment of colonies of algae that are capable of fixing nitrogen.

Once an algal turf is established and grown, it must be harvested. Harvesting of the turf is preferably performed before the turf is overgrown by larger macro-algae. Harvesting of the algal turf can be accomplished by simply scraping the surface of the screen.

After harvesting of the algal turf, immediate regrowth of the algal turf will occur in the cleared screens, since the screens are sufficiently coarse to retain a portion of the filamentous algae after harvesting. The remaining filamentous algae will reestablish colonies in the mesh screens.

The period of growth and the subsequent need for harvesting are dependent on the many variables that determine the rate of growth of the algal turf, such as exposure to and intensity of the light, temperature, surge action of the wave, and, hence, the flow rate of water across the screens, the screen size, and the availability of nutrients. Each of these conditions may be varied to promote the growth of a particular species of algae or to improve the growth rate of all the algal colonies that are established in the algal tray.

The Ocean

The Ocean is divided into a deep "ocean" region 48 and a shallower "lagoon" region 50 by an intervening Coral Reef 52. A small portion of Coral Reef is included in the Ocean for its role in the carbon cycle and to provide a suitable habitat for some of the plant and animal species which live in the Ocean. About 250 species of fish are also included in the Ocean. The fish excrete ammonia into the water in their wastes. Naturally-occurring microorganisms convert the ammonia to nitrates, which are then available as nutrients for algae.

In the Marshland, tides are used to recirculate water, nutrients, and pollutants. Similarly, recirculation of water in the Ocean is achieved by the action of waves. Waves induced along the surface of the Ocean by a wave generator 46 are propagated along the surface of the Ocean and may spill over the Coral Reef and continue beyond, into the Lagoon region.

The Wave Generator

The wave generator 46 is installed adjacent to an edge of the Ocean. The wave generator includes a water elevator positioned next to the Ocean, a blower for exhausting air, and an air buffer connected between the blower and the water elevator. The water elevator includes a water-lift chamber rising above the surface of the Ocean, an opening extending below the surface of the Ocean for exchanging water between it and the chamber, and air inlets and outlets for respectively admitting air into and exhausting air from the water-lift chamber.

Connected between the blower and the water-lift chamber air outlet is an air buffer, through which air is drawn by the blower from the chamber. Valves periodically open and close the air inlet and air outlet of the water-lift chamber so that, when the air inlet is closed and the air outlet is open, water is raised in the water-lift chamber. When the air outlet is closed and the air inlet is opened, water drops within the chamber and is expelled through its underwater opening, inducing a wave along the surface of the Ocean.

The blower operates continually, and pressure fluctuations, which tend to be induced by the periodic opening and closing of the valves, are smoothed out by the air buffer before they reach the blower. The air buffer includes a first air chamber pneumatically connected to the air intake, a last air chamber pneumatically connected to the water-lift-chamber air outlet, and at least one intermediate air chamber pneumatically connected between the first and last air chambers through openings in the inter-chamber partitions.

The Desalting Process

Water in the Estuary is continually being added from the Freshwater Pond at its source. This water eventually flows into the Ocean. Water, therefore, has to be continually removed from the Ocean to prevent it from filling up and overflowing, and also to prevent dilution of the salt concentration of the Ocean. However, since the water from the Ocean is salty, it must be desalted before it can be reused in other areas of Biosphere 2. The desalination of the Ocean water is achieved by a low-pressure, low-temperature distillation unit. The desalted water from the Ocean is then used for watering crops, as a partial supply of fresh water to the headwaters of the Rainforest biome, or other uses where freshwater is required. The brine which results from the desalting process is returned to the Ocean.

THE RAINFOREST/SAVANNAH BIOMES

The Rainforest

Rainforests are derived from tropical zones and are characterized generally by their evergreen canopy and warm and moist climates. Rainforests, in nature, generally receive over 250 centimeters of rainfall per year. The rainfall is delivered in a seasonal downpour during the monsoonal months.

The rainfall in the Rainforest of Biosphere 2 varies seasonally over a four- to six-month period, and the annual precipitation accumulations range from about 150 to 250 centimeters. A system of overhead pipes delivers a spray, to simulate rain. Daily rainfall in the Rainforest biome can vary from zero to two centimeters per hour.

Freshwater is introduced into the Rainforest biome as rain and mist onto a Sphagnum Moss region 66 at an elevation of about 20.12 meters (see FIG. 3). The water seeps from the Sphagnum Moss into a pond, "Little Tiger Pond" 67, which is at an elevation of about 19.61 meters. The seepage from the moss is relatively acidic, approximately pH 5.5 to 6.0, which results in a slightly acidic pH of the water in Little Tiger Pond. Additional water is added to Little Tiger Pond from an Ocean water desalting plant and recycled from a Splash Pond 70.

The water from Little Tiger Pond flows over a Waterfall 68 and into the Splash Pond. The Splash Pond is at an elevation of about 14.94 meters. The Splash Pond provides "spray" moisture to ferns and plants which are grown in areas adjacent to the Waterfall, maintaining the high-humidity environment that they require for their proliferation.

Water from the Splash Pond cascades into "Tiger Pond" 72. The elevation of Tiger Pond varies from a low of about 13.56 meters to a high of about 14.63 meters. This approximately-one-meter change occurs as a result of a moving control gate or weir 73 which can be raised or lowered, as required, to simulate seasonal flooding in "Crystal Creek" 78. The rate of rise or decline in both Tiger Pond and Crystal Creek is approximately four centimeters per week. For a six-month period, during the wet season, the water levels are rising, and for six months, during the dry season, the water levels are declining.

To supplement the flow and volume of water in Tiger Pond, water is recycled to Tiger Pond from downstream. The water is supplied by the action of recirculation pumps 74, which draw water from a storage tank 76 at the bottom of a downstream creek, Crystal Creek. A portion of this water is also discharged into the Splash Pond. The recirculation of the water in Tiger Pond dilutes the higher acidity of the waters flowing out of Little Tiger Pond.

The water from Tiger Pond is discharged downstream into Crystal Creek.

The Crystal Creek water levels vary from an elevation of about 12.8 meters to about 13.87 meters. This approximate one-meter difference is a simulation of seasonal rates, and the water levels are increased for six months, then decline for six months. These fluctuations in the water levels are controlled by a movable weir.

A movable weir is located on the storage tank 76 that intercepts the water-flow from Crystal Creek. The storage tank is a box-like structure and is constructed with a vertical opening on one of its faces. Water flows into the vertical opening, and the water level in Crystal Creek is maintained at the level of the bottom of the opening.

To vary the water level in Crystal Creek, the level of the vertical opening in the storage tank is raised. Raising of the vertical opening is achieved by raising a gate which is positioned to cover and slide over the vertical opening. At the low water level, the gate is in its lowest position. At the high water level, the gate is in its raised position, and water is retained in Crystal Creek until the new, raised level is achieved and the water level is raised to the high water level. When the high water level is reached, water again flows into the storage tank.

A water flow-through device is also mounted on the gate of the storage tank. This flow-through device directs water from Crystal Creek to a Savannah Stream 82. The flow-through device comprises a small-diameter tubing which restricts the amount of water able to flow through to the Savannah Stream. One end of the tubing is attached to a filter, which is included to filter large matter from water flowing through the tubing and to prevent clogging. The other end of the tubing is located at an upper elevation of the Savannah Stream. The flow-through device is attached to the top of the movable gate and is positioned so that it remains below water level as the movable gate is raised and lowered.

The soil of the Rainforest is mostly sandy silts with some organic material added. During the rainy season, the soil of the Rainforest biome becomes saturated. However, if left in place, the water and soil would stagnate and become anaerobic. The anaerobic soil would be unable to support the growth of the plants in this region. Therefore, the soil moisture content, particularly below the vadose zone, is controlled by the use of a perforated pipe system 80. The perforated pipes are placed in a gravel-and-sand filter medium under the soil layer. Water is released from the pipes by a drain valve. The water drained from the Rainforest is available for recycling.

The Pumping System

The pumping system of the Rainforest is preferably a "gentle" system, since freshwater phytoplankton and zooplankton exist in the food chain of the Rainforest water. The use of high-pressure mechanical pumps, such as centrifugal impeller pumps, would result in damage to and death of these microorganisms after the many recycling passages to which the water is subjected. Therefore, the gentle action of a vacuum pumping system is used. The high lifts of the water from Tiger Pond, at an elevation of about 13.56 meters, to Little Tiger Pond, at an elevation of about 19.61 meters, requires three to four separate stages of vacuum pumps to achieve the required lift.

A suitable pump for use in the present invention comprises two cylinders, with an inlet check valve and an outlet check valve at the lower end of each of the cylinders. A two-way vacuum valve at the upper end of the two cylinders communicates with the interiors of the cylinders. The vacuum valve forms a two-opening gate valve. The gate of the valve slides in a T-shaped channel overlying two holes, one of which leads to each of the chambers of the pump. The gate has a single hole through which is inserted a bulkhead fitting. The bulkhead fitting is connected to a flexible vacuum line. The gate is connected to a linear actuator which can stroke the gate between positions overlying each of the two holes.

When the gate overlies one of the holes, air is evacuated from the corresponding chamber of the pump to elevate water through the suction check valve. At the same time, the hole for the other chamber is opened to the atmosphere, and water drains from that chamber through the discharge check valve. Thus, one chamber is filling while the other is emptying, and the valve cycles back and forth between the two. If desired, the gate can be moved slowly between openings so that the rush of water is minimized. A pump of this nature is shown in U.S. Pat. No. 232,638.

Minimizing the rush of water, and the gentle lifting action of the pump, results in little or no damage to the organisms present in the water as the water is transferred from one micro-environment to another.

The Savannah

The Savannah 16 is a tropical-to-sub-tropical grassland characterized by sparse trees and drought-resistant, underlying vegetation.

The rainfall is varied seasonally over a period of about seven months, with annual precipitation accumulations of approximately 30 inches. Daily rainfall over the Savannah can vary from zero to several inches, in less than an hour. The distribution of the precipitation generally increases for two months, is then steady for three months, and finally declines for two months. At the end of the rainy season, there is a dry period of approximately five months.

There are two sub-zones in the Savannah. The Savannah Stream 82 and Billabongs 84 constitute the first zone. The second zone is rain-fed grasslands 86, which actually represent a Savannah zone, which occurs in nature about 20 to 30 miles away from streams.

In the first zone, the Billabongs are seasonally flooded from the overflowing of the Savannah Stream. Although the flood water is predominantly from the Savannah Stream, the rise of water from the stream is so gradual that the Billabongs are also flooded by water from auxiliary water supplied by feed lines. Water in the Savannah Stream flows through the length of the stream and into a flow-through capacitor tank 88 at its lower end. Water is then recycled by pumps back to the headwater of the Savannah Stream. The low water level of the Savannah Stream is at an elevation of about 11.28 meters during the dry season, and the high water level is about 11.73 meters during the wet season. These fluctuations in the water levels are controlled by the movable weir, as described above.

The flooding of the Billabongs is achieved independently of each other at a rate of approximately six centimeters per week, for eight weeks, at the beginning of the rainy season. The water level in the Billabongs is maintained at this maximum flood level for about three months during the wet season. At the end of the wet season, the water is drained from the Billabongs at a rate of about six centimeters per week, over a period of eight weeks, or until both Billabongs are dry. Drains are provided in the Billabongs to drain them at the end of the wet season.

The pumping system of the Savannah is preferably a "gentle" system, since freshwater phytoplankton and zooplankton exist in the food chain of the Rainforest water. The use of high-pressure mechanical pumps, such as centrifugal impeller pumps, would result in damage to and death of these microorganisms after the many recycling passages to which the water is subjected. Therefore, the gentle action of the vacuum pumping system described above is used.

In the second zone, an impervious barrier separates the rain-fed grasslands of the second Savannah zone and flooded grasslands of the first Savannah zone. The impervious barrier comprises a water-tight liner which lines the basin containing the Savannah Stream and the Billabongs. The liner is coated with sealing compounds, such as concrete veneer and marine epoxy, to form an impervious barrier. The top of the impervious lining extends to the high water levels of the Savannah Stream and the Billabongs.

When the Savannah Stream and the Billabongs are flooded, water is unable to seep into the rain-fed grasslands of the second zone as a result of the impervious lining. Therefore, the rain-fed grasslands are maintained as a distinct and separate environment for the establishment of grasses that are adapted to low levels of seasonal rainfall.

The Savannah Stream contains limestone in a sandy soil. During the wet season, the soil of the Savannah biome becomes saturated. However, if left in place, the water and soil would stagnate and become anaerobic. The anaerobic soil would be unable to support the growth of the plants in this region. Therefore, the soil moisture content, particularly below the vadose zone, is controlled by the use of a perforated pipe system. The perforated pipes are placed in a gravel-and-sand filter medium under the soil layer. Water is released from the pipes by a drain valve. The water drained from the Savannah is collected and is available to be pumped back to the headwaters of the Savannah Stream, a central water storage tank, or to be used for flooding the Billabongs.

THE DESERT/THORNY SCRUB BIOMES

The Desert 20 and Thorny Scrub 18 biomes are environments for the growth of drought-resistant plants. The plants selected for growth in the Desert biome are typically those found in coastal fog deserts, where there is low rainfall but high humidity. Little or no water is added to this region of Biosphere 2. However, a watering system of pipes is provided to apply water to this region as required.

AGRICULTURAL REGION

Located adjacent to the Savannah biome is an intensive Agricultural Zone and Human Habitat 21.

The floor of the intensive Agricultural Zone is closed to the external environment, as is the floor of the whole of Biosphere 2. This closed floor is overlain by a 2000-square-meter layer of soil having a thickness of about 0.5 meter to about 1.5 meters, and preferably having a thickness of about one meter. Crops are established in the soil layer. Water is applied to the crops in the intensive Agricultural Zone, as required, to support optimum growth of the plants. The water is applied by drip irrigation or by overhead spraying or flooding. Any excess irrigation water, which may be rich in nutrients, is drained from the Agricultural Zone and is recycled to ensure that all plant nutrients are effectively utilized. Under optimal conditions, water applied to the Agricultural Zone will be balanced to meet the needs of the plants, thus eliminating, or at least reducing, any runoff.

WATER PURIFICATION SYSTEMS

The water within Biosphere 2 is a limited commodity and therefore is recycled and purified to maintain a continuous supply of water to meet the need of the humans, animals and crops within Biosphere 2.

Waste Water Treatment

The waste-treatment systems of Biosphere 2 are designed to accommodate waste generated by up to eight people, in addition to farm animals and industrial waste from laboratories and a mechanical workshop.

In general, wastes are collected and flushed with water through drains to banks of holding tanks. The wastes are cycled from the holding tanks through lagoons containing microorganisms and plants which aerobically metabolize contaminants in the water, converting them to usable biomass and nontoxic compounds.

A major part of the aerobic treatment process of the waste lagoons is attributed to microorganisms living on and around the plant root system. Once microorganisms are established on aquatic and marsh plant roots, they form a symbiotic relationship with the plant. This relationship normally produces a synergistic effect, resulting in increased degradation rates and removal of organic chemicals from the waste water surrounding the plant roots.

During microbial degradation of the organic materials, metabolites are produced which the plants absorb and utilize, along with nitrogen, phosphorus, and minerals, as a food source. Microorganisms also use some or all metabolites released through plant roots, as a food source. This symbiotic relationship of one organism using another's waste allows for the rapid removal of organic materials from waste water.

Aquatic and marsh plants have the ability to translocate oxygen from the upper leaf areas to the roots, producing an aerobic zone around the roots, which is desirable in waste treatment for the growth of aerobic microorganisms.

Aquatic and marsh plant roots are also capable of absorbing, concentrating and, in some cases, translocating toxic heavy metals and certain radioactive elements, therefore removing them from the water system. In addition, aquatic and marsh plants have the ability to absorb some organic molecules intact where they are translocated and eventually metabolized by plant enzymes.

The plants that are preferred for use in the waste treatment are aquatic plants (plants that will grow without a solid surface in which roots are established) and marsh plants (plants that require soil to establish a root system). The plants are selected for their ability to remove the contaminating components of the waste, such as heavy metals and organic compounds, for their usefulness as a food source for animals or for man, or for their usefulness as a compost fertilizer. The plants will grow. Therefore, their mass will increase and require periodic harvesting to remove plants and allow the regrowth of new plants.

Exemplary marsh plants suitable for use in the lagoons include *Typha latifolia, Scirpus validus, Phragmites communis, Sagittaria latifolia, Canna edulis*, and *Acorus calamus*. Aquatic plants suitable for use in the lagoons include Azola, Duckweed, and Water Hyacinths.

The waste from different sources is treated in different waste-treatment systems; one treatment system is devoted to human waste, while a separate treatment system is devoted to the treatment of a combination of animal and industrial waste. Each of the wastes is handled in a similar manner. Therefore, only one waste-treatment system is described.

Waste is collected into three anaerobic holding tanks. The human waste is retained in the anaerobic holding lagoons for a minimum of 24 hours, allowing microorganisms to anaerobically process the tanks' contents. However, animal and industrial waste need not be held for this period of time.

The contents of the anaerobic holding tanks is piped to a first waste lagoon. Two diffusers are provided at the inlet of the first lagoon to aerate the anaerobic waste as it enters the lagoons and aid in the aerobic decomposition of the contaminants in the waste.

Each of the lagoons is sectioned with baffles which direct the flow of waste back and forth along the length of the lagoon. The use of baffles in the lagoon results in a longer total distance over which the waste flows, allows the whole area of the lagoon to be used and increases the residence time of the waste in the lagoon.

Each of the lagoons also includes layers of gravel covered with layers of soil, in which the plants are planted. The gravel and soil are spread uniformly over the floor of the lagoon to form gravel and soil beds in the first lagoon. In the other lagoons the soil and gravel layers are arranged to leave an open water channel around the baffles.

The gravel and soil areas are planted with marsh plants at an average density of about 40-45 plants per square meter of surface area. The open water channels are planted with aquatic plants. Fish are also added to the open water channels. The fish eat mosquito larvae that may breed in the water. In addition, the fish act as "gardeners," keeping the roots of the plants free from disease.

When the flow of waste has completed its passage through the first lagoon, it is then directed out of the first lagoon and into a second lagoon.

Flow from the second lagoon is directed to a third lagoon. Marsh and aquatic plants, growing in each lagoon, promotes degradation of the wastes.

Waste from the third lagoon is tested to determine its purity. If the purity is of the required minimum quality, the waste is pumped to a waste sump tank. If the waste is not of the required minimum quality, it is recycled back to the inlet of either the first, second or third lagoon, where it will undergo further purification.

Waste from the waste sump tank is filtered and sterilized, then stored in a utility tank and used in rice paddies or for any other use for which it may be required.

Potable Water

Water for use as potable water is collected from distillers and condensers. Water is continually being evaporated in Biosphere 2 from the Ocean, ponds, streams, Marshland, and the agricultural uses, by the radiant heat of the sun. This "greenhouse effect" results in a large volume of water being removed from the liquid phase and being converted into the gas phase. As a result of this evaporation, the atmosphere within the closed Biosphere 2 becomes very humid.

To reduce the humidity, and to use the energy source provided by the sun, the water evaporated into the atmosphere of Biosphere 2 is condensed, to provide water that is suitable for human consumption. In addition to the water collected from the atmosphere by condensation, potable water may also be generated by distillation, where the energy required for the evaporation of the water is provided by energy systems internal to Biosphere 2, rather than relying on the energy from the sun. This water vapor is then condensed and added to the water condensed from the atmosphere, to provide an adequate potable water supply.

THE WATER CYCLE

Figure 4:
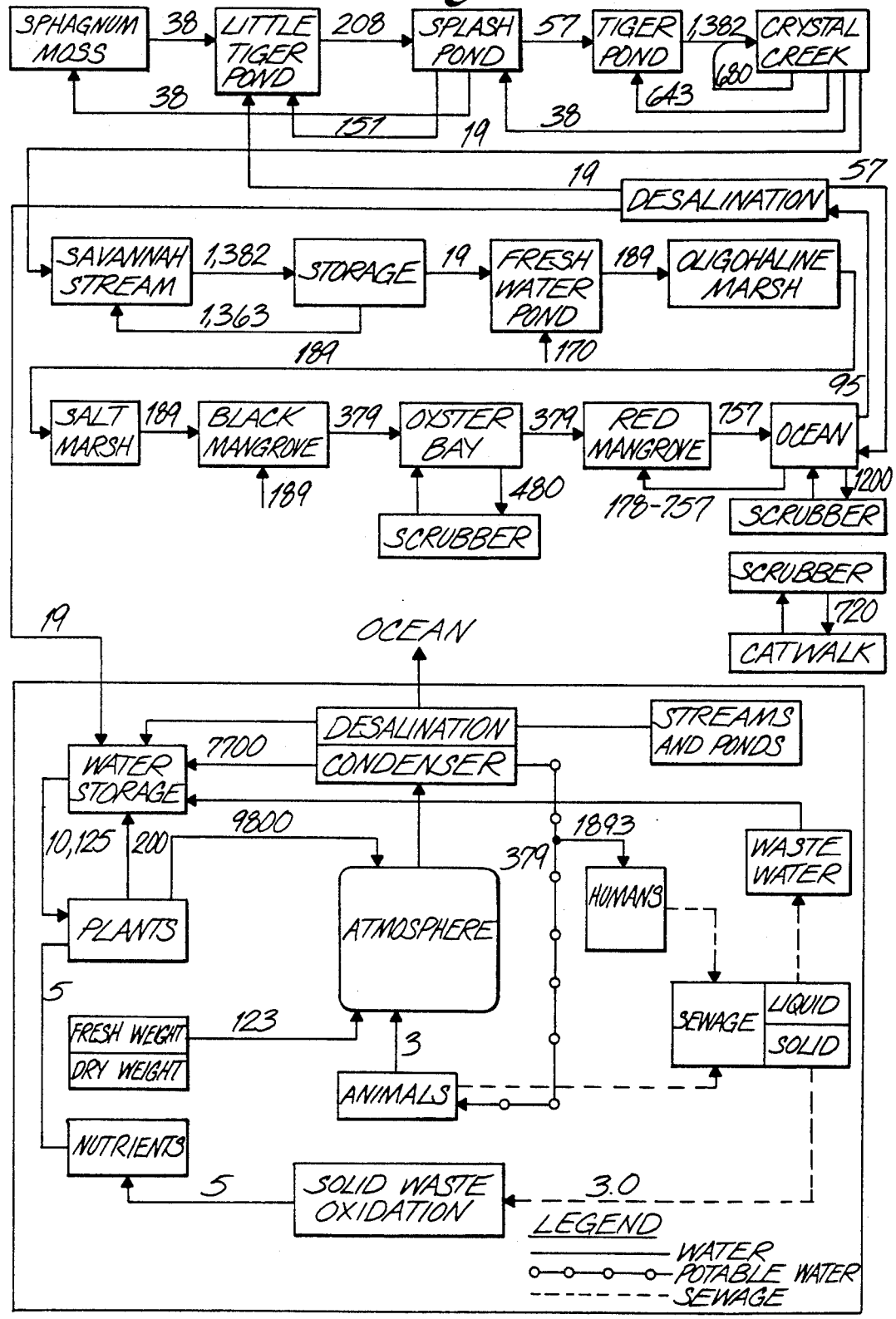
FIG. 4 is a schematic block diagram illustrating an exemplary closed cycle of water within the closed ecological system.

The above, qualitative description outlines the biomes in which water is used in Biosphere 2 and the various uses of the water. It also describes the overall recycling plan of the water. FIG. 4 and the discussion below provide a semi-quantitative description of an embodiment of the water balance, or equilibrium, of Biosphere 2. The water-flows given are generally the flows required to maintain the low water levels in the biomes. However, these water levels will vary seasonally as water from rainfall is added to the biomes. The values given for the Wilderness biomes are in liters per minute, and for the Agricultural Zone and Human Habitats (boxed area), are in liters per day. It should be noted that the water balance given is only exemplary and may differ from time to time. It will also be noted that imbalances appear due to rounding discrepancies. Further, quantities may differ appreciably from time to time due to water transferred by evapo-transpiration, condensation, and return to the liquid water cycle.

The Rainforest and Savannah Biomes

Water-flow in the Rainforest 14 begins with water flowing from the Sphagnum Moss 66 at the highest elevation of the biome, 20.12 meters. A sump pump removes about 190 liters per minute (l/m) of water from the Splash Pond 68. Of this water, 40 l/m is delivered to the Sphagnum Moss, at multiple points, and is allowed to percolate through the Sphagnum Moss. The remaining 150 l/m is fed into Little Tiger Pond 67. An additional 20 l/m is added to Little Tiger Pond from the desalination plant of the Ocean 12. The water from the Sphagnum Moss flows into Little Tiger Pond at a rate of about 40 l/m. These water-flows result in a total of 210 l/m flowing through Little Tiger Pond.

This 210 l/m discharges from Little Tiger Pond at an elevation of about 19.61 meters, over the Waterfall 68, and into the Splash Pond at an elevation of about 14.94 meters. Water is removed from the Splash Pond at a rate of about 190 l/m, for return to the Sphagnum Moss and Little Tiger Pond, leaving about 20 l/m to flow through to Tiger Pond 22. To this amount is added 40 l/m, which is pumped from the storage tank at the bottom of Crystal Creek 78, giving a total of 57 l/m flowing into Tiger Pond.

Flow from the Splash Pond discharges into Tiger Pond, which varies in elevation from a low water level of about 13.56 meters to a high water level of about 14.63 meters.

Water is added to Tiger Pond by pumping from the storage tank at the bottom of Crystal Creek. Each pump pumps about 680 l/m. One pumping system discharges approximately 640 l/m of the 680 l/m into Tiger Pond. The remaining 38 l/m are discharged into the Splash Pond. The other pump discharges about 680 l/m into the headwaters of Crystal Creek. This flow, combined with the water from the Splash Pond, makes a total flow of about 1,400 l/m into Crystal Creek.

Of the water flowing through Crystal Creek, about 1,380 l/m is collected at the bottom of Crystal Creek in a storage tank. This water is then available to be recycled back to Tiger Pond and Splash Pond. The remaining 20 l/m is diverted to flow down into the Savannah biome.

In the Savannah biome 16, water is continually recycled, as in the Rainforest biome. Water is introduced into the headwaters of the Savannah Stream 82 at a rate of about 1,380 l/m. Of this total, about 20 l/m are supplied by the flow-through device located in Crystal Creek, and about 1,380 l/m is pumped from the storage tanks at the bottom of the Savannah Stream.

Water flows down the Savannah Stream, where about 1,380 l/m is collected in the storage tanks and is available for recycling to the headwaters of the Savannah Stream. The approximately-20 l/m of freshwater that was fed to the headwaters of Little Tiger Pond from the desalination unit in the Ocean biome, flows through the Rainforest into the Savannah, and is piped to the Freshwater Pond above the Estuary.

The Ocean/Estuary Biome

Water, about 20 l/m, is transferred from the bottom of the Savannah Stream to the Freshwater Pond, which is at the highest elevation of the marsh system, at 8.49 meters. To this 20 l/m is added about 170 l/m of freshwater from recycling the Freshwater Pond. This 20 l/m then flows down through the Oligohaline Marsh 26 and the Salt Marsh 28. An additional 190 l/m is recycled to the Black Mangrove Marsh 30 from the Red Mangrove Marsh.

In the Oyster Bay 32, 480 l/m of flow from the Estuary algal turf scrubbers is added at the top of the Oyster Bay, and 480 l/m is removed from the bottom of the Oyster Bay, and flows to the algal turf scrubbers for purification. Therefore, there is a total flow of about 860 l/m through the Oyster Bay, but only about 380 l/m enters from the Black Mangrove Marsh, and only 380 l/m is discharged into the Red Mangrove Marsh 38.

In addition to the water flowing down through the Marshland, the Red Mangrove Marsh will also experience large flow rates of tidal exchange from the Ocean. From about 170 to about 760 l/m of Ocean water is pumped into the Red Mangrove Marsh. This tidal exchange will also result in increased volumes of water in the other marsh regions as the tide in the Marshland rises. The Oligohaline Marsh will experience the least turnover, rising and lowering only 7.5 centimeters over the tidal cycle and having only about 190 l/m of recirculation flow.

The tidal flow and the flow from the recirculation are discharged into the Ocean.

The 3,785,000-liter saltwater Ocean is approximately 7.5 meters deep. The maximum flow rate between the Ocean and the Estuary is approximately 760 l/m.

In addition to the flow into the Ocean, it is necessary to recirculate the Ocean water, to maintain a healthy marine life system. Recirculation is accomplished by the use of downdraft pipes in the wave chamber. Six 15-centimeter pipes (four at the top and two at the bottom of the Ocean) discharge wave water, each wave cycle at levels below the Ocean surface. The pipes are set to allow for average recirculation of about 2,300 l/m at a level of about 1.22 meters below the Ocean surface and about 150 l/m near the bottom of the Ocean. These flows provide adequate circular turnover in the deep Ocean.

Recirculation of Lagoon water is accomplished by wave action. The top of the Coral Reef is at an elevation of from about 3.5 meters to about 3.54 meters and is above Ocean surface approximately 50% of the time. Waves breaking (and traveling unbroken) over the Coral Reef are "flushed" back into the deep Ocean from the Lagoon via the Coral Reef Channel 96. This recirculates from about 37,700 to about 56,800 l/m of water in the Lagoon.

Water is also removed from and returned to the Ocean for processing over the algal turf scrubbers.

The Ocean and the Marshland are connected by the Crabwalk 38. Algal scrubber intakes and outlets are located in the Crabwalk to dilute the high nutrient level of the water as it is released from the Marshland. Additional intakes and outlets for algal scrubbers are also located in the Ocean and Marshland for processing the water from these sources. Separate scrubbers are used for the Ocean water, Oyster Bay water, and Crabwalk water to avoid commingling.

In one embodiment of the practice of the present invention, one algal turf scrubber consists of two, one-meter-square screens. Water is delivered to the algal tray from the scrubber bucket every 10 to 15 seconds, at a flow rate of approximately 40 l/m. Therefore, for example, 18 algal turf scrubbers dedicated to the Crabwalk will process 720 l/m of water from the Crabwalk. This value is in excess of the average tidal return, from the estuary, of 570 l/m. Therefore, on average, all the returning water from the Estuary will be treated before it enters the Ocean.

About 30 scrubbers are used for the Ocean, 18 for the Crabwalk, and 12 for the Estuary. This accounts for a flow over each of the scrubbers of about 1,200 l/m, 720 l/m and 480 l/m, respectively.

Water from the Ocean is also removed for desalination. The desalination system consists of scrubber system piping that removes about 1,200 liters from the ocean to the scrubber system. From this, about 100 l/m is drawn off to the desalination system. Of the 100 l/m, 40 l/m of freshwater is produced, about 20 l/m of which is returned to the headwaters of the Rainforest and about 20 l/m of which is transferred to the Habitat area to be treated for domestic use, such as irrigation and as livestock water.

The remaining 60 l/m is brine and is returned to the scrubber room for redistribution to the Ocean.

The Agricultural and Human Habitats

The last phase of the water cycle includes the intensive Agricultural and Human Habitats. The major component of this system is the water which is drawn into the atmosphere by evaporation and which accounts for about 10,000 liters per day (l/d), but this amount can vary from 0 l/d to about 11,000 l/d, depending on the season. This atmospheric water is derived from: animals through respiration, about 3 l/d; plants through respiration and transpiration, about 9,800 l/d; and from drying of harvested plant matter, about 120 l/d.

The atmospheric water is condensed and stored. Additional water from the runoff from plant irrigation is stored. The stored water is used for plant irrigation. Water from condensation is used as potable water for humans (about 1,900 l/d) and for animals (about 400 l/d).

The present invention is described in relation to only one embodiment and is for illustrative purposes. Variations will be apparent to those skilled in the art. Therefore, the present invention is not intended to be limited to the embodiment described above. The scope of the invention is defined by the following claims.

What is claimed is:

1. A hydrological circulation system in a closed ecological system, isolated from the Earth's environment, comprising:
   means for retaining water within the closed ecological system and preventing water from entering the closed ecological system;
   a plurality of diverse micro-environments, each of which simulates an environment of Earth, contained within the closed ecological system;
   means for selectively watering each of the micro-environments for promoting the growth of organisms adapted for growth in the diverse environments;
   means for collecting the water from each of the micro-environments;
   means for transferring the collected water to other micro-environments for distributing nutrients; and
   means for removing pollutants from the water.

2. A hydrological circulation system as recited in claim 1, wherein the means for transferring water from one micro-environment to another is means of permitting water to flow by gravity to lower elevations and means for pumping water to higher elevations.

3. A hydrological circulation system as recited in claim 1, wherein the means for removing pollutants from the water comprises a biological digester.

4. A hydrological circulation system as recited in claim 1, wherein the means for removing pollutants from the water comprises a chemical reactor.

5. A hydrological circulation system as recited in claim 1, wherein the means for removing pollutants from the water comprises an algal scrubber.

6. A hydrological circulation system in a closed ecological system having a predetermined total water supply, comprising:
   an enclosure for retaining water within the enclosure and preventing water from entering the enclosure;
   a plurality of micro-environments within the closed ecological system, each micro-environment comprising a plurality of organisms characteristic of a similar micro-environment on Earth outside the closed ecological system;
   means for circulating water from one micro-environment to another within the closed ecological system; and
   means of removing water from a micro-environment, extracting nutrients from the removed water with photosynthetic algae, and returning the extracted water to the same micro-environment.

7. A hydrological circulation system as recited in claim 6, wherein the means for circulating water from one micro-environment to another is means for permitting water to flow by gravity to lower elevations and means for pumping water to higher elevations.

8. A hydrological circulation system as recited in claim 6, wherein the total water supply comprises both fresh water and saltwater.

9. A closed hydrological circulation system comprising:
   an enclosure for retaining water within the enclosure and preventing water from entering the enclosure and within the enclosure:
   a saltwater reservoir;
   a simulated tidal estuary adjacent to the saltwater reservoir;
   means for introducing fresh water to an upper portion of the simulated tidal estuary;
   an elongated channel in open communication at one end with the saltwater reservoir between the estuary and the saltwater reservoir;
   means for transferring saltwater from the saltwater reservoir to a lower portion of the estuary on a periodic basis; and
   means for permitting flow of water from the estuary to the elongated channel for gradually commingling water from the estuary with water from the saltwater reservoir.

10. A closed hydrological circulation system as recited in claim 9 further comprising:
    means for removing water from the elongated channel;
    means for removing nutrients from the water from the elongated channel; and
    means for returning the water to the elongated channel.

11. A closed hydrological circulation system as recited in claim 9 further comprising:
    a fresh water system comprising a plurality of streams and ponds in sequence with water flowing from a higher elevation through such ponds and streams toward a lower elevation;
    means for recycling a major portion of the water in the fresh water system from lower elevation to higher elevation; and
    means for passing a minor portion of the water from the fresh water system into the upper portion of the estuary.

12. A closed hydrological circulation system as recited in claim 11 further comprising means for seasonally varying the flow of water in the fresh water system.

13. A closed hydrological circulation system as recited in claim 11 further comprising means for condensing water evaporated in the closed hydrological circulation system and returning condensed water to the fresh water system.

14. A closed hydrological circulation system as recited in claim 11 further comprising means for desalting a portion of the saltwater and recovering fresh water.

15. A closed hydrological circulation system comprising:
- an enclosure for retaining water within the enclosure and preventing water from entering the enclosure and within the enclosure:
  - a fresh water system comprising a plurality of streams and ponds in sequence with water flowing from a higher elevation through such ponds and streams toward a lower elevation;
- means for recycling a major portion of the water in the fresh water system from lower elevation to higher elevation;
- means for removing a minor portion of the water from the fresh water system; and
- means for condensing water evaporated in the closed hydrological circulation system and returning condensed water to the fresh water system.

16. A closed hydrological circulation system as recited in claim 15 further comprising means for seasonally varying the flow of water in the fresh water system.

17. A closed hydrological circulation system as recited in claim 15 further comprising means for desalting saltwater and recovering fresh water.

* * * * *